United States Patent
Choi et al.

(10) Patent No.: US 9,108,578 B2
(45) Date of Patent: Aug. 18, 2015

(54) INVISIBLE SLIDING DOOR TRIM STRUCTURE

(71) Applicants: Hyundai Motor Company, Seoul (KR); Kwangjin Co., Ltd., Asan-si, Chungcheongnam-do (KR)

(72) Inventors: Jae Hong Choi, Gyeonggi-do (KR); Young Bae Gong, Chungcheongnam-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 13/933,866

(22) Filed: Jul. 2, 2013

(65) Prior Publication Data

US 2014/0265430 A1    Sep. 18, 2014

(30) Foreign Application Priority Data

Mar. 15, 2013    (KR) .................. 10-2013-0027737

(51) Int. Cl.
*B60R 13/02*    (2006.01)
*B60J 5/04*    (2006.01)
*B60J 5/06*    (2006.01)

(52) U.S. Cl.
CPC ............. *B60R 13/0243* (2013.01); *B60J 5/047* (2013.01); *B60J 5/06* (2013.01)

(58) Field of Classification Search
CPC .............. B60J 5/06; B60J 5/12; B60J 1/16; E05D 15/58; E05D 15/0652; E05D 15/0686; E05D 2015/485; E05Y 2900/531; B60R 25/01; B60R 13/0243

USPC ....................... 296/146.7, 155, 153
See application file for complete search history.

(56) References Cited

U.S. PATENT DOCUMENTS

| 2009/0199480 | A1* | 8/2009 | Ehrhard .......................... 49/212 |
| 2011/0047882 | A1* | 3/2011 | Thota et al. .................... 49/404 |
| 2012/0280532 | A1 | 11/2012 | Bisinger et al. | |

FOREIGN PATENT DOCUMENTS

| JP | 2007-290637 A | 11/2007 |
| JP | 2008-162382 A | 7/2008 |
| JP | 2008-162385 A | 7/2008 |
| JP | 2010-064594 A | 3/2010 |
| KR | 10-2007-0057385 A | 6/2007 |

* cited by examiner

*Primary Examiner* — Joseph D Pape
*Assistant Examiner* — Dana Ivey
(74) *Attorney, Agent, or Firm* — McDermott Will & Emery LLP

(57) ABSTRACT

An invisible sliding door trim structure includes a luggage trim provided at one side of a vehicle body opening part opened or closed by a door and including a reception space extended in a horizontal direction, a sliding trim provided at an inner side of the door and slid along the reception space of the luggage trim according to an opening or closing operation of the door, and a rotating trim provided to be rotatable with respect to the sliding trim according to the opening or closing operation of the door. Therefore, an invisible sliding door trim is capable of improving an appearance and overcoming a design restriction problem of a sliding door according to the prior art.

9 Claims, 10 Drawing Sheets

INVISIBLE SLIDING DOOR TRIM STRUCTURE

CROSS-REFERENCE TO RELATED APPLICATION

This application is based on and claims priority from Korean Patent Application No. 10-2013-0027737, filed on Mar. 15, 2013 in the Korean Intellectual Property Office, the disclosure of which is incorporated herein in its entirety by reference.

TECHNICAL FIELD

The present disclosure relates to an invisible sliding door trim, and more particularly, to an invisible sliding door trim structure capable of improving an appearance and solving a design restriction problem of a sliding door by covering movement along a moving trajectory of an invisible sliding door.

BACKGROUND

Generally, a vehicle provided with a sliding door has a structure in which the door is slid to be as close as possible to a vehicle body when opening the door to improve convenience in getting on and getting off in a narrow space.

As shown in FIGS. 1 and 2, a sliding door of a vehicle according to the prior art includes a vehicle body 100 provided with a vehicle body opening part 200 to be opened or closed by sliding a door 400 to allow a passenger to get on or get off the vehicle therethrough; a rail 300 provided in the vehicle body 100 in order to slide the door 400; a roller 500 inserted into the rail 300 provided in the vehicle body 100; and an arm 600 having one side fixed to the door 400 and the other side supporting the roller 500. The rail 300 includes an upper rail 301 provided in the vehicle body 100 adjacent to an upper side of the vehicle body opening part 200, a lower rail 303 provided in the vehicle body 100 adjacent to a lower side of the vehicle body opening part 200, and a center rail 302 positioned at the rear of the vehicle body 100 and extended in a length direction of the vehicle on an outer surface of the vehicle body 100. An operation of the sliding door is regulated according to a layout of the rail 300 described above.

However, the sliding door according to the prior art as described above has problems in that a structure of the vehicle body opening part 200 becomes complicated by the rail 300, the center rail 302 is provided on the outer surface of the vehicle body 100, such that an appearance of the vehicle is deteriorated, and many design restrictions are present in the vehicle due to the rail.

Therefore, an invisible sliding door with a modularized sliding door structure has been developed to simplify a sliding door structure, such that the sliding door may be mounted on a passenger car and a sport utility vehicle (SUV) without any design restriction. Therefore, research and development of a door trim covering an interior of the invisible sliding door have been required.

SUMMARY

Accordingly, the present disclosure has been made to solve the above-mentioned problems occurring in the prior art while advantages achieved by the prior art are maintained intact.

One subject to be achieved by the present disclosure is to provide an invisible sliding door trim that is capable of improving an appearance and overcoming a design restriction problem of a sliding door according to the prior art and corresponds to an invisible sliding door.

An aspect of the present disclosure provides an invisible sliding door trim structure including: a luggage trim provided at one side of a vehicle body opening part to be opened or closed by a door with a reception space extended in a horizontal direction; a sliding trim provided at an inner side of the door and slid along the reception space of the luggage trim according to an opening or closing operation of the door; and a rotating trim provided to be rotatable with respect to the sliding trim according to the opening or closing operation of the door.

The sliding trim may cover an invisible slider sliding the door when opening or closing the door and be fixed to the invisible slider, and the rotating trim may cover a rotator rotating the door when opening or closing the door and be fixed to the rotator.

The invisible slider may include: a slider rail covered by a luggage trim and slides with respect to a first slider fixed to one side of a vehicle body opening part; a second slider installed on the slider rail to slide the slider rail; and a driver transferring a driving force to the second slider.

The rotator may have a link structure in which it has one side rotatably provided at the invisible slider, the other side fixed to the door, and receives the driving force from the driver to thereby be rotated.

The rotating trim may include an overlapped part partially overlapped with the sliding trim at the time of rotating the door.

The overlapped part may have an arc shape in which it is protruded outwardly.

An end portion of the sliding trim may be provided with a rotation guide part overlapped with the overlapped part while enclosing the overlapped part at an outer side of the overlapped part, and the rotation guide part may have an inclined angle.

The rotating trim may be provided with a link hole perforated from a front end portion adjacent to the door in a length direction of the rotating trim to facilitate partial rotation of the link structure.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Hereinafter, the present disclosure will be described in detail with reference to the accompanying drawings. An invisible sliding door trim structure according to an exemplary embodiment of the present invention includes a luggage trim provided at one side of a vehicle body opening part being opened or closed by a door and a reception space extended in a horizontal direction; a sliding trim provided at an inner side of the door and slid along the reception space of the luggage trim when opening or closing by the door; and a rotating trim provided to be rotatable with respect to the sliding trim when opening or closing.

Figure 1:
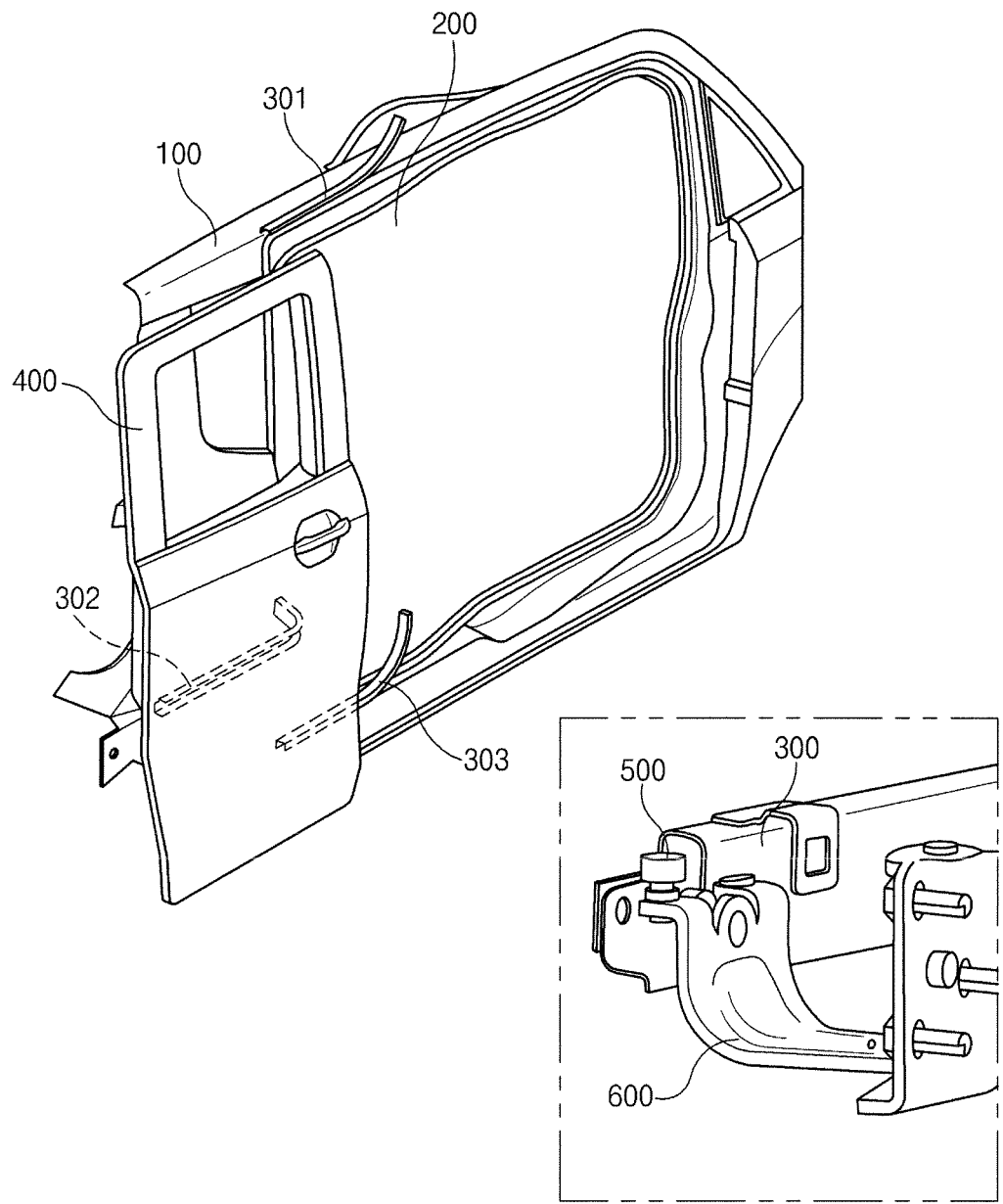
FIG. 1 is a view showing a structure of a sliding door according to the prior art.
Figure 2:
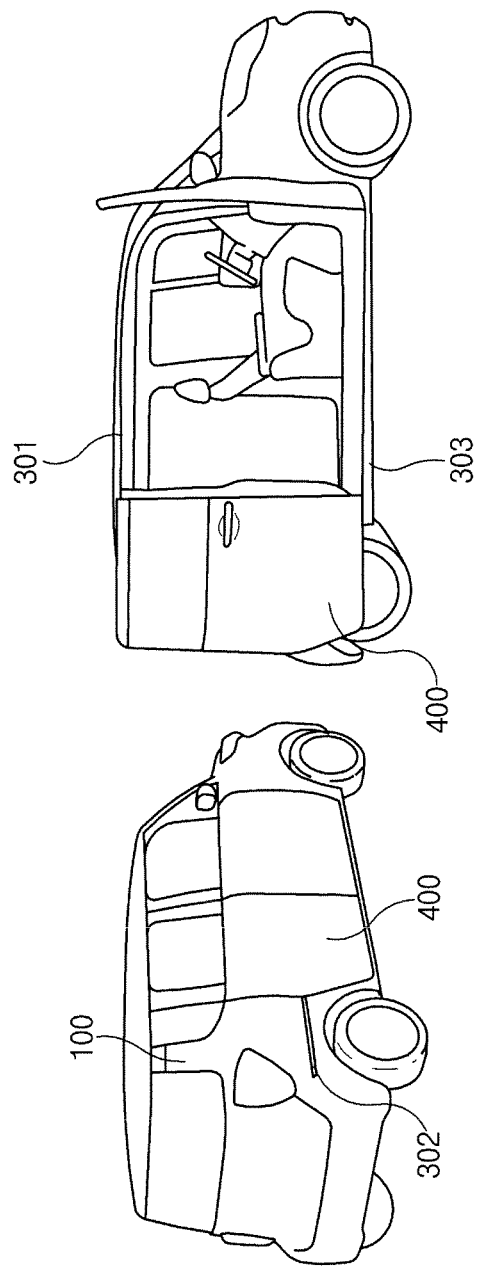
FIG. 2 is a view showing a vehicle provided with the sliding door according to the prior art.
Figure 3:
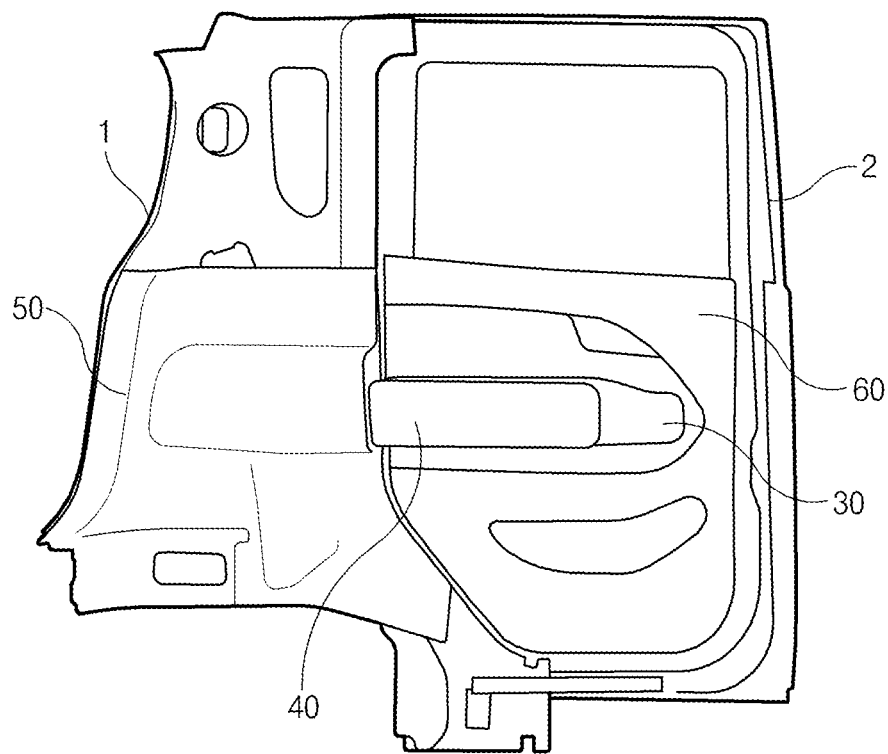
FIG. 3 is a view showing a state in which a door is closed in an invisible sliding door trim structure according to an exemplary embodiment of the present invention.
Figure 4:
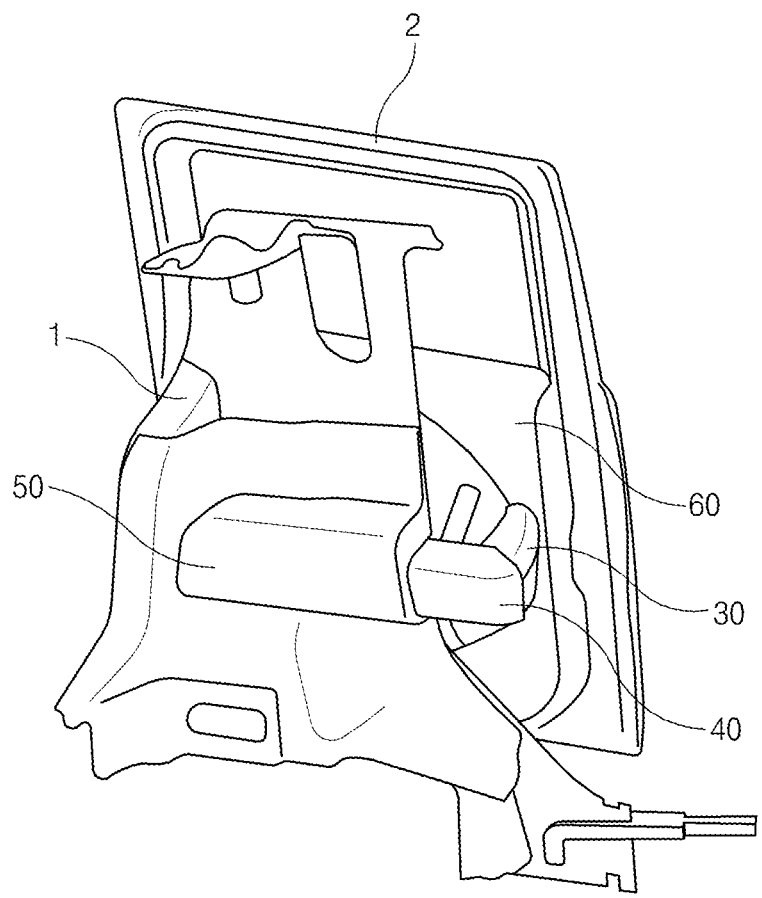
FIG. 4 is a view showing a state in which a door is opened in an invisible sliding door trim structure according to an exemplary embodiment of the present invention.
Figure 5:
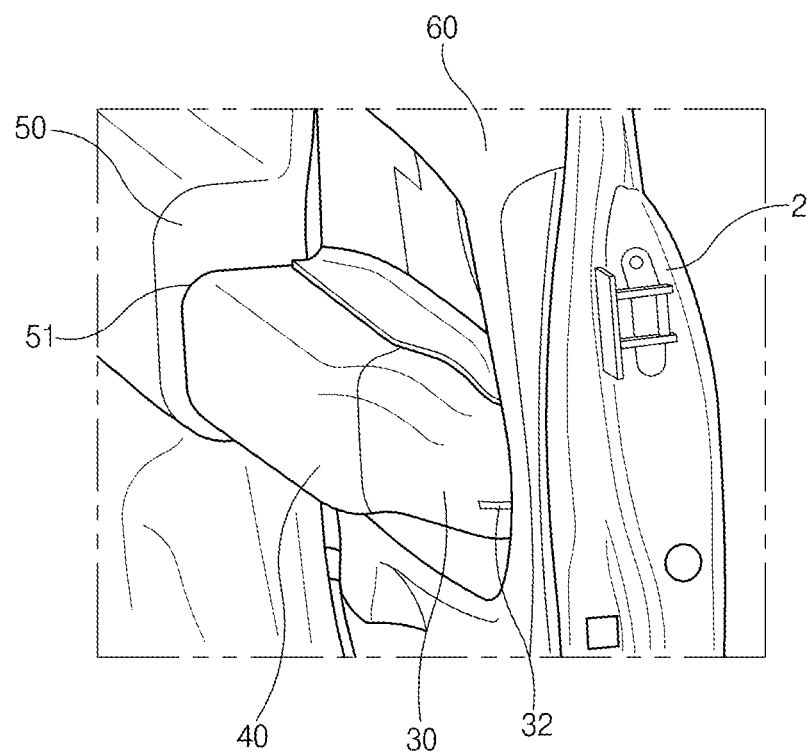
FIG. 5 is an enlarged view of the invisible sliding door trim structure according to the exemplary embodiment of the present invention.
Figure 10:
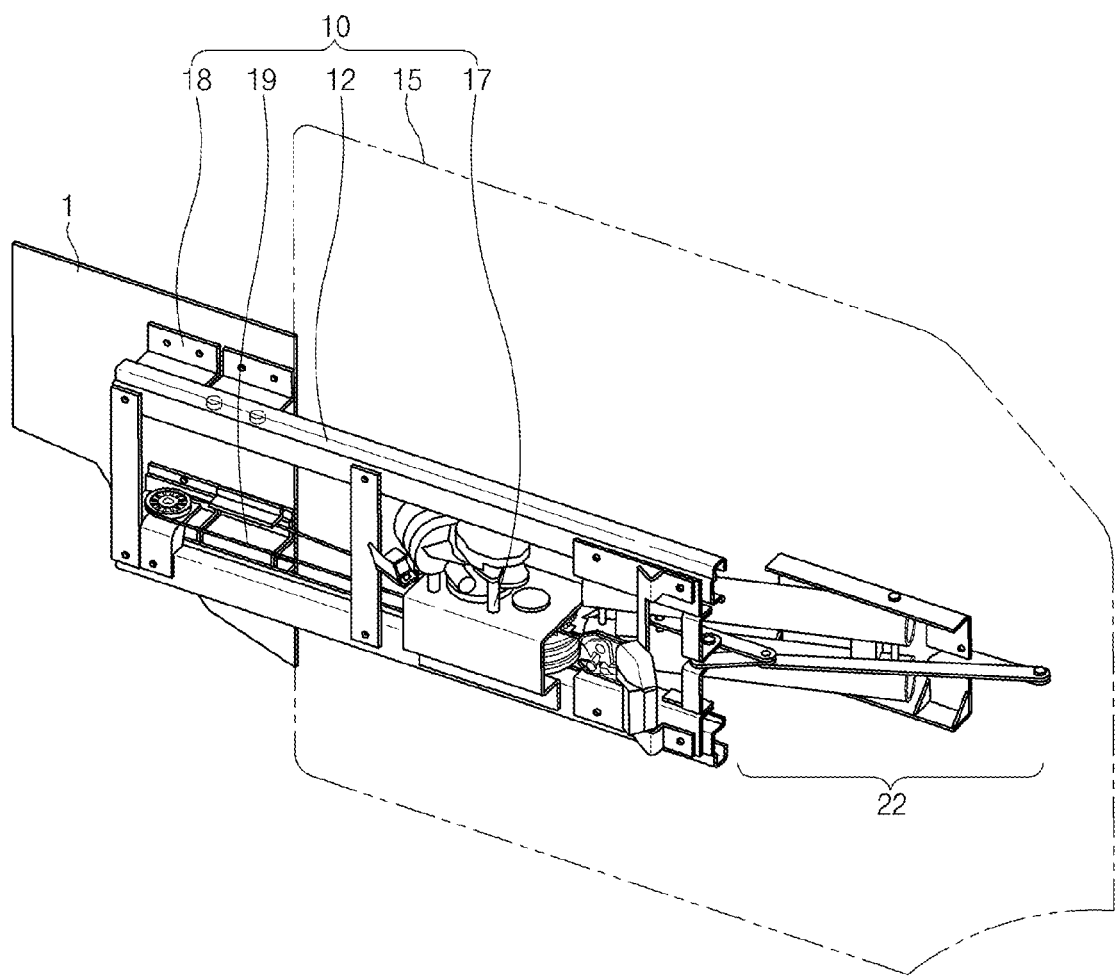
FIG. 10 is a view showing a structure of an invisible sliding door.

Referring to FIGS. 3 and 10, the luggage trim 50 is provided at a position adjacent to the vehicle body opening part 15 in a vehicle body 1, and the reception space 51 formed in the luggage trim 50 (see FIG. 5). The reception space 51 is an empty space for a sliding trim 40 to be inserted and withdrawn and extends in a length direction of a vehicle. The reception space 51 has a larger size than that of the sliding trim 40 to prevent foreign materials being introduced and improve aesthetics of an appearance. However, the reception space 51 is not necessarily limited thereto, but may be provided as a space having a size and a shape to insert and draw the sliding trim 40.

The sliding trim 40 covers an invisible slider 10 sliding the door 2 at when opening or closing the door 2 and is fixed to the invisible slider 10. When the door 2 is in a closed state, the sliding trim 40, which is positioned at the center of a door trim 60, serves as an arm rest (see FIG. 3). The sliding trim 40 protrudes toward an interior of the vehicle with a 'U' shape forming an empty space in order to cover the sliding structure.

The sliding trim 40 is connected to the invisible slider 10 and covers the invisible slider 10, which includes a slider rail 12 therein (see FIG. 10), such that the sliding trim 40 and the invisible slider 10 move together.

The invisible slider 10 slides the door 2 to open or close the vehicle body opening part 15. More specifically, the invisible slider 10 includes a first slider 18 fixed to the vehicle body, the slider rail 12 slid with respect to the first slider 18, a second slider 19, and a driver 17 as illustrated in FIG. 10.

As shown in FIG. 10, the first slider 18 is mounted on the vehicle body adjacent to the vehicle body opening part 15. The first slider 18 is configured of two mounting brackets fixed to the vehicle body 1 with a predetermined interval therebetween in a vertical direction and rollers rotatably mounted on the mounting brackets.

The slider rail 12 is slidably mounted on the mounting bracket of the first slider 18. The slider rail 12 receives the two mounting brackets and rollers to roll-contact with the rollers and slides with respect to the first slider 18.

In order to allow the slider rail 12 to be slid, the slider rail 12 is provided with a driver 17 for generating a driving force and a second slider 19 for sliding the slider rail 12 with respect to the first slider 18.

The driver 17 includes a motor and a sector gear connected to the motor. The motor is supported by a motor bracket provided in the slider rail 12, and the sector gear is connected to the motor to transfer the driving force from the motor to a rotator.

The second slider 19, which is a component for sliding the slider rail 12 with respect to the first slider 18, includes a drum and a wire. The drum is connected to the motor to receive the driving force from the motor. The wire winds around the drum and also around a pulley fixed to the slider rail 12 to be placed between the drum and the pulley. Therefore, when the drum is rotated by the driving force from the motor, the wire is wound and unwound to slide the slider rail 12 with respect to the first slider 18.

Figure 7:
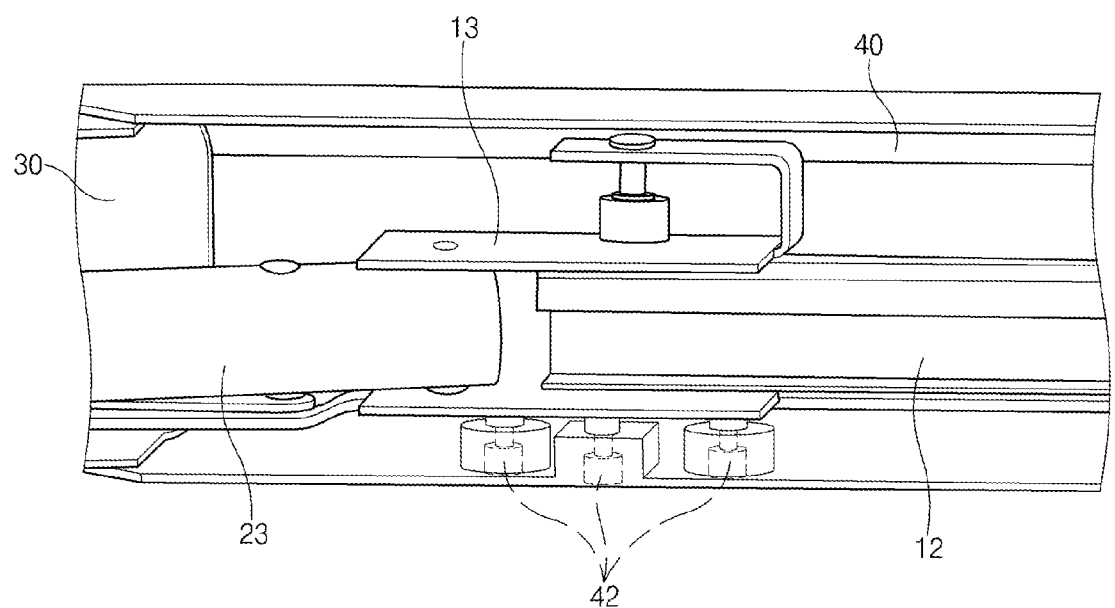
FIG. 7 is a view showing a sliding trim of the invisible sliding door trim structure according to the exemplary embodiment of the present invention.

The second slider 19 is connected to and covered by the sliding trim 40 to slide together with second slider 19 at the time of opening or closing the door. In an embodiment of present invention, as shown in FIG. 7, a nut coupling hole 42 is provided in an inner side surface of the sliding trim 40, where a nut is welded to a body bracket 13, and the nut coupling hole 42 and the nut welded to the body bracket 13 are connected to each other through three-point bolt assembling to couple the body bracket 13 and the sliding trim 40. However, the body bracket 13 and the sliding trim 40 are not necessarily limited to being connected as described above.

The sliding trim 40 is connected to the invisible slider 10 operating together with the slider rail 12, such that it slides with respect to the luggage trim 50. The sliding trim 40 is disposed inside of the reception space 51 of the luggage trim 50 when opening the door 2 and is withdrawn from the reception space 51 when closing the door 2.

The rotating trim 30 is provided to be rotatable with respect to the sliding trim 40 according to the opening or closing operation of the door 2. The rotating trim 30 covers the rotator 22 rotating the door 2 at the time of the opening or closing operation of the door 2, and is fixed to the rotator 22 to be rotated together.

The rotator 22 connects the invisible slider 10 to the door 2 and rotates the door 2 when opening or closing the door 2. More specifically, the rotator 22 connects the slider rail 12 to the door 2 and receives the driving force from the driver 17 at the time of opening or closing the door 2 to rotate the door 2. More specifically, the rotator 22 has a six-bar link structure in which one side is connected with the invisible slider 10 and the other side is fixed to the door 2.

Figure 9:
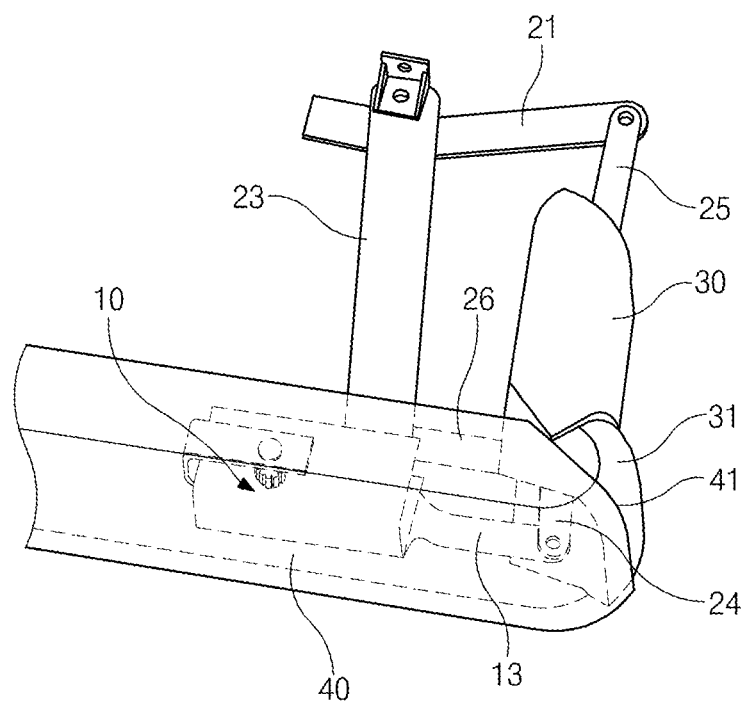
FIG. 9 is a view showing coupling between the rotating trim and the sliding trim of the invisible sliding door trim structure according to the exemplary embodiment of the present invention when the door is in an opened state.

Referring to FIG. 9, the rotator 22 has the six-bar link structure in which it includes a main arm 23 having one side connected to a door bracket 21 disposed at the door 2 and the other side connected to the body bracket 13, which is fixed to the slider rail 12, and receives the driving force from the sector gear. A first link 24 has one side rotatably connected to the body bracket 13 and is extended toward the door bracket 21, a second link 25 has one side rotatably connected to an end portion of the first link 24 and the other side rotatably connected to the body bracket 13 of the vehicle body, and a third link 26 has one side rotatably connected to a portion at which the first and second links 24 and 25 are connected to each other and the other side rotatably connected to one side of the main arm 23. The rotator 22 has one rectangle shape with the body bracket 13, the first link 24, the main arm 23, and the third link 26, and the door bracket 21, the main arm 23, the second link 25, and the third link 26 form another rectangle.

Figure 6:
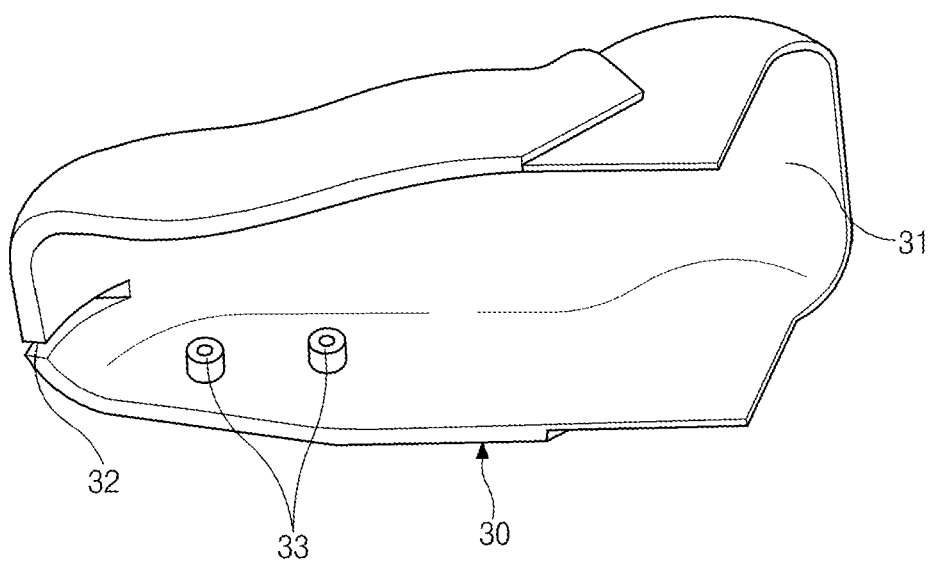
FIG. 6 is a view showing a rotating trim of the invisible sliding door trim structure according to the exemplary embodiment of the present invention.

The rotator 22 is covered by the rotating trim 30, which is connected to the rotator 22 to be rotated together at the time of opening or closing the door. In the present embodiment, link nut coupling holes 33 (See FIG. 6) are disposed on a bottom surface of the rotating trim, and nuts are welded to the first link 24 of the rotator 22, and the link coupling holes 33 and the nuts welded to the first link 24 are connected to each other by bolting the rotator 22 and the rotating trim 30. However, the rotator 22 and the rotating trim 30 are not necessarily limited to being connected each other as described above.

The rotating trim 30 preferably has an empty inner portion in order to cover the rotator 22 and an outer portion in a smooth curved line and is connected with the rotator 22 to thereby be rotated with respect to the sliding trim 40 when opening or closing the door 2.

Here, the rotating trim 30 is provided with a link hole 32 so that rotation of the rotator 22 is not hindered by the rotating trim 30. The link hole 32 is formed to be lengthily perforated from a front end portion adjacent to the door 2 in a length direction of the rotating trim 30.

The rotating trim 30 is overlapped with the sliding trim 40. More specifically, an end portion of the sliding trim 40 is overlapped with the rotating trim while enclosing an outer side of the rotating trim 30 to prevent spacing between the rotating trim 30 and the sliding trim 40 due to rotation of the rotating trim 30 with respect to the sliding trim 40 according to the opening or closing of the door, thereby preventing an internal structure from being exposed.

Figure 8:
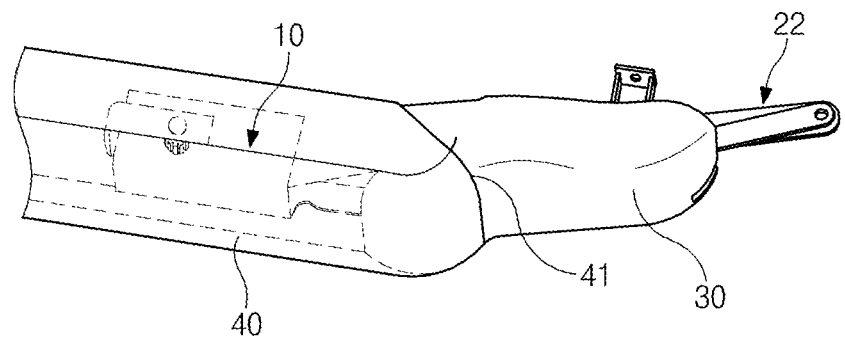
FIG. 8 is a view showing coupling between the rotating trim and the sliding trim of the invisible sliding door trim structure according to the exemplary embodiment of the present invention when the door is in a closed state.

In addition, one end portion of the rotating trim 30 overlapped with the sliding trim 40 is provided with an overlapped part 31 so that the rotating trim 30 is easily rotated with respect to the sliding trim 40. The overlapped part 31 is a part overlapped with the sliding trim 40 as the rotating trim 30 is rotated together with the rotation of the rotator 22. The overlapped part 31 is overlapped with or withdrawn from the sliding trim 40 formed to enclose the outer side of the rotating trim 30 according to the rotation of the rotating trim 30. The overlapped part 31 has an arc shape in which it is protruded outwardly. This is to allow the rotating trim 30 to be smoothly operated with respect to the sliding trim 40 when the rotating trim 30 is rotated together with the rotation of the rotator 22. As shown in FIGS. 8 and 9, the rotating trim 30 is rotated at an angle of 80 to 100 degrees according to the closing or the opening of the door 2. The reason why the rotation angle is 80 to 100 degrees is that the rotating trim 30 is rotated together with the rotator 22 according to the rotation angle of the rotator 22. However, in order to further limit the rotation motion of the rotating trim 30, an end portion of the sliding trim 40 contacting the overlapped part 31 is provided with a rotation guide part 41.

The rotation guide part 41, which is disposed at the end portion of the sliding trim 40 so as to have an inclined angle, as shown in FIG. 9, has an inclined angle of 30 to 60 degrees. Therefore, the overlapped part 31 contacts the rotation guide part 41 at the time of rotation to limit the rotation motion, and is also supported by the rotation guide part 41 to further limit a rotation angle of the rotating trim 30.

An operation of the invisible sliding door trim structure will be described. The motor of the driver 17 is rotated in order to open or close the door 2, and the sector gear and the drum receiving the driving force from the motor are also rotated. Therefore, the main arm 23 is rotated by the sector gear, and the first to third links 24, 25, and 26 are moved by the rotation of the main arm 23 to rotate the door 2. The rotating trim 30 is also rotated together with the first to third links 24 to 25. The overlapped part 31 of the rotating trim 30 is rotated while being withdrawn from an inner side of the sliding trim 40 in a state in which it is inserted. Therefore, the rotating trim 30 forms an angle of 80 to 100 degrees with respect to the sliding trim 40.

In addition, the wire winds or unwinds as the drum rotates, and the slider rail 12 is slid with respect to the slider 18 by a length at which the wire is wound or unwound. Therefore, as the slider rail 12 is slid, the entire door 2 is slid. At the same time, the body bracket 13 provided on the slider rail 12 is slid. Therefore, the sliding trim 40 connected to the body bracket 13 is also slid together with the body bracket 13 to thereby be inserted into the reception space 51 of the luggage trim 50.

Likewise, when the door 2 is being closed, as the slider rail 12 is slid, the entire door 2 is slid in a direction opposite to a direction of being opened. At the same time, the body bracket 13 provided on the slider rail 12 is slid. Therefore, the sliding trim 40 connected to the body bracket 13 is also slid together with the body bracket 13 to thereby be withdrawn from the reception space 51 of the luggage trim 50. After the sliding trim 40 is slid, the rotator 22 is rotated in order to close the door 2, and the rotating trim 30 is also rotated with respect to the sliding trim 40 together with the rotator 22. Therefore, the overlapped part 31 of the rotating trim 30 is inserted into the inner side of the sliding trim 40. In this case, the overlapped part 31 is supported by the rotation guide part 41 of the sliding trim 40 so as not to be further rotated. Therefore, the sliding trim 40 and the rotating trim 30 form an angle of 165 to 195 degrees therebetween.

As set forth above, an invisible sliding door trim that is capable of improving an appearance and overcoming a design restriction problem of a sliding door according to the prior art and is appropriate for an invisible sliding door is used, thereby making it possible to cover the movement according to a moving trajectory of the invisible sliding door simultaneously covering an interior of the invisible sliding door.

Although the present disclosure has been described with reference to the exemplary embodiment shown in the accompanying drawings, it is only illustrative and various exemplary embodiments are possible. Therefore, the scope of the present disclosure is to be defined by the claims.

What is claimed is:

1. An invisible sliding door trim structure comprising:
   a luggage trim provided at one side of a vehicle body opening part which is opened or closed by a sliding door, the luggage trim including a reception space extended in a horizontal direction;
   a sliding trim provided at one side of the sliding door and sliding longitudinally along the reception space of the luggage trim when the sliding door is opening or closing; and
   a rotating trim provided to be rotatable with respect to the sliding trim when the sliding door is opening or closing,
   wherein the rotating trim is fixed to and covers a rotator, the rotator rotating the rotating trim when the sliding door is opening or closing,
   the rotator has a link structure in which a plurality of links are connected to each other to rotate the rotating trim, and
   the sliding trim covers an invisible slider sliding the sliding door at the time of opening or closing of the sliding door and sliding trim is fixed to the invisible slider.

2. The invisible sliding door trim structure according to claim 1, wherein the invisible slider includes:
   a first slider rail covered by the luggage trim and relatively slid with respect to a first slider fixed to the one side of the vehicle body opening part;
   a second slider installed on a second slider rail to slide the second slider rail, the second slider being connected to and covered by the sliding trim; and
   a driver for generating by a motor and transferring a driving force to the second slider,
   wherein the second slider rail is fixed to the first slider rail.

3. The invisible sliding door trim structure according to claim 2,
wherein the link structure of the rotator has one link of the plurality of links rotatably connected to the invisible slider, another link of the plurality of links fixed to the sliding door, and the rotator receives the driving force from the driver to be rotated.

4. The invisible sliding door trim structure according to claim 1, wherein the rotating trim includes an overlapped part stepped in from the rotating trim, the overlapped part partially overlapping with and covered by the sliding trim when the rotator rotates.

5. The invisible sliding door trim structure according to claim 4,
wherein the overlapped part has an arc shape protruding outwardly.

6. The invisible sliding door trim structure according to claim 4,
wherein an end portion of the sliding trim is provided with a rotation guide part overlapping with the overlapped part while the end portion of the sliding trim enclosing an outer side of the overlapped part, and
the rotation guide part has an inclined angle.

7. The invisible sliding door trim structure according to claim 1,
wherein the rotating trim is provided with a link hole perforated from a front end portion adjacent to the sliding door in a length direction of the rotating trim to facilitate partial rotation of the link structure.

8. The invisible sliding door trim structure according to claim 1, wherein the link structure comprises:
a main arm having one end connected to a door bracket of the sliding door and another end connected to a body bracket of a vehicle body;
a first link having one end rotatably connected to the body bracket and extending toward the door bracket;
a second link having one end rotatably connected to another end of the first link; and
a third link having one end rotatably connected to a portion at which the first and second links are connected to the one end of the main arm,
wherein the rotating trim has link nut coupling holes formed on a bottom surface thereof and the first link has nuts to be bolted to the link nut coupling holes.

9. An invisible sliding door trim structure comprising:
a luggage trim provided at one side of a vehicle body opening part which is opened or closed by a sliding door, the luggage trim including a reception space extended in a horizontal direction;
a sliding trim provided at one side of the sliding door and sliding along the reception space of the luggage trim when the sliding door is opening or closing; and
a rotating trim provided to be rotatable with respect to the sliding trim when the sliding door is opening or closing,
wherein the rotating trim is fixed to and covers a rotator, the rotator rotating the rotating trim when the sliding door is opening or closing,
the rotator has a link structure in which a plurality of links are connected to each other to rotate the rotating trim,
the sliding trim covers an invisible slider sliding the sliding door at the time of opening or closing of the sliding door and sliding trim is fixed to the invisible slider, and
wherein the rotating trim includes an overlapped part stepped in from the rotating trim, the overlapped part partially overlapping with and covered by the sliding trim when the rotator rotates.

* * * * *

UNITED STATES PATENT AND TRADEMARK OFFICE
CERTIFICATE OF CORRECTION

PATENT NO. : 9,108,578 B2  
APPLICATION NO. : 13/933866  
DATED : August 18, 2015  
INVENTOR(S) : Jae Hong Choi et al.

Page 1 of 1

It is certified that error appears in the above-identified patent and that said Letters Patent is hereby corrected as shown below:

On the title page

(73) Assignee:

"Hyundai Motor Company, Seoul (KR)"

should read

-- Hyundai Motor Company, Seoul (KR) and Kwangjin Co., Ltd., Asan-si, Chungcheongnam-do (KR) --.

Signed and Sealed this  
Twenty-sixth Day of July, 2016

Michelle K. Lee  
*Director of the United States Patent and Trademark Office*